(12) United States Patent
Munter et al.

(10) Patent No.: US 6,381,247 B1
(45) Date of Patent: Apr. 30, 2002

(54) SERVICE INDEPENDENT SWITCH INTERFACE

(75) Inventors: Ernst August Munter, Kanata; Chris W. L. Hobbs, Ottawa, both of (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/215,464

(22) Filed: Dec. 17, 1998

(51) Int. Cl.[7] .......................... H04L 12/56; H04L 12/66
(52) U.S. Cl. .................. 370/419; 370/413; 370/422
(58) Field of Search ................... 370/252, 359, 370/362, 389, 391, 395.1, 395.5, 395.7, 412, 413, 419, 421, 422, 463, 906, 907; 709/201

(56) References Cited

U.S. PATENT DOCUMENTS

| | | | |
|---|---|---|---|
| 5,168,492 A | 12/1992 | Beshai et al. | |
| 5,745,486 A | 4/1998 | Beshai et al. | 370/352 |
| 5,809,021 A * | 9/1998 | Diaz et al. | 370/364 |
| 5,905,725 A * | 5/1999 | Sindhu et al. | 370/389 |
| 5,987,026 A * | 11/1999 | Holland | 370/353 |
| 6,125,438 A * | 9/2000 | Okamoto et al. | 712/35 |
| 6,275,499 B1 * | 8/2001 | Wynn et al. | 370/438 |

* cited by examiner

Primary Examiner—Hassan Kizou
Assistant Examiner—Ahmed Elallam

(57) ABSTRACT

A switch interface connected between a fiber optic cable and a switching fabric includes a line interface block, a fabric interface block, and ingress and egress data transfer blocks coupled independently between the line interface and fabric interface blocks. The ingress data transfer block has a cross-connection block connected to the line interface block, four memories, two processors, and the fabric interface block. With use of the cross-connection block, at any one time, one memory is coupled to the line interface block, one memory is coupled to one processor, one memory is coupled to the other processor, and the last memory is coupled to the fabric interface. Controlled by a memory control, the memories rotate which block each is coupled to, so that each memory is coupled to every block within a single cycle. Therefore, data information units traversing the ingress data transfer block do not require to be transferred between memories during the processing stages. The egress data transfer block operates in a similar fashion.

33 Claims, 3 Drawing Sheets

SERVICE INDEPENDENT SWITCH INTERFACE

FIELD OF THE INVENTION

This invention relates generally to packet data communications and more specifically to interfaces within packet data communication networks.

BACKGROUND OF THE INVENTION

Internet capacity, along with the speed of packet transmission within the Internet, is increasing at an incredibly fast pace, requiring fast packet forwarding decisions in the range of several million packets per second. This growth of the Internet is fostering the introduction of new protocols and variations on existing protocols to enable the implementation of larger and higher capacity networks. While the design of the protocols has traditionally relied upon software programs for implementation within routers, allowing for a great deal of flexibility, the speed of conventional Central Processing Unit (CPU) hardware and architectures is no longer capable of handling the rates of traffic required.

The higher speeds associated with data packet forwarding within routers can be accommodated with custom hardware with the use of Application Specific Integrated Circuits (ASICs), but the relative inflexibility of hardware solutions and their longer development cycle make them less attractive in this continuously changing environment. In fact, the increased sophistication needed to support Internet Protocol (IP) Quality of Service (QoS) handling is difficult to provide in hardware, for it requires a substantial amount of processing power. As well, the limited expected lifespan of data routing and forwarding products makes low development costs and short time-to-market more important factors than the actual product cost.

To overcome this problem of implementing purely software or purely hardware solutions, software programmable computers or micro-controllers have been used in the past to perform packet forwarding. The problem with such implementations now is that the conventional computer architectures used within these devices impose severe limits, especially in their memory subsystems, and are not directly suitable for processing data packets at the rates required.

Therefore, a flexible service-independent interface is required that can be used for packet forwarding. This interface should be completely re-configurable so as to adapt with changing protocols while supporting a variety of different protocols and services at any one time, each service possibly operating at different transmission rates. Preferably, this implementation should not lock the interface into using a particular processor or prevent the interface from being scaled to an arbitrary number of processors, but should be kept flexible while keeping the development cost low.

SUMMARY OF THE INVENTION

It is an object of the present invention to overcome the disadvantages of the prior art and, in particular, to provide an apparatus whereby data information units can be efficiently transferred.

According to a first aspect, the present invention provides an interface apparatus capable of being coupled between first and second data apparatuses, the interface apparatus comprising at least one processor and at least three memory devices; and wherein each of the memory devices is arranged to be coupled to the first data apparatus during different respective time periods to input and store data information units from the first data apparatus; each of the memory devices is arranged to be coupled to the processor during different respective time periods to process the stored data information units with use of the processor; and each of the memory devices is arranged to be coupled to the second data apparatus during different respective time periods to output the processed data information units to the second data apparatus.

According to a second aspect, the present invention provides an interface apparatus arranged to be coupled between first and second data apparatuses, the interface apparatus comprising at least one ingress processor, at least three ingress memory devices, at least one egress processor, and at least three egress memory devices; wherein each of the ingress memory devices is arranged to be coupled to the first data apparatus during different respective time periods to input and store first data information units from the first data apparatus; each of the ingress memory devices is arranged to be coupled to the ingress processor during different respective time periods to process the stored first data information units with use of the ingress processor; and each of the ingress memory devices is arranged to be coupled to the second data apparatus during different respective time periods to output the processed first data information units to the second data apparatus; and wherein each of the egress memory devices is arranged to be coupled to the second data apparatus during different respective time periods to input and store second data information units from the second data apparatus; each of the egress memory devices is arranged to be coupled to the egress processor during different respective time periods to process the stored second data information units with use of the egress processor; and each of the egress memory devices is arranged to be coupled to the first data apparatus during different respective time periods to output the processed second data information units to the first data apparatus.

According to a third aspect, the present invention provides in an interface apparatus arranged to be coupled between first and second data apparatuses, a method of transferring data information units between the first and second apparatuses comprising the steps of: coupling each of at least three memory devices to the first data apparatus at different respective first times; inputting data information units from the first data apparatus to each of the memory devices during different respective first time periods starting at the different respective first times; uncoupling each of the memory devices from the first data apparatus and coupling each of the memory devices to a processor at different respective second times; processing the stored data information units within each of the memory devices with use of the processor during different respective second time periods starting at the different respective second times; uncoupling each of the memory devices from the processor and coupling each of the memory devices to the second data apparatus at different respective third times; and outputting the processed data information units within each of the memory devices to the second data apparatus during different respective third time periods starting at the different respective third times.

BRIEF DESCRIPTION OF THE DRAWINGS

The preferred embodiment of the present invention is described with reference to the following figures, in which.

DETAILED DESCRIPTION OF THE PREFERRED EMBODIMENT

Figure 1:
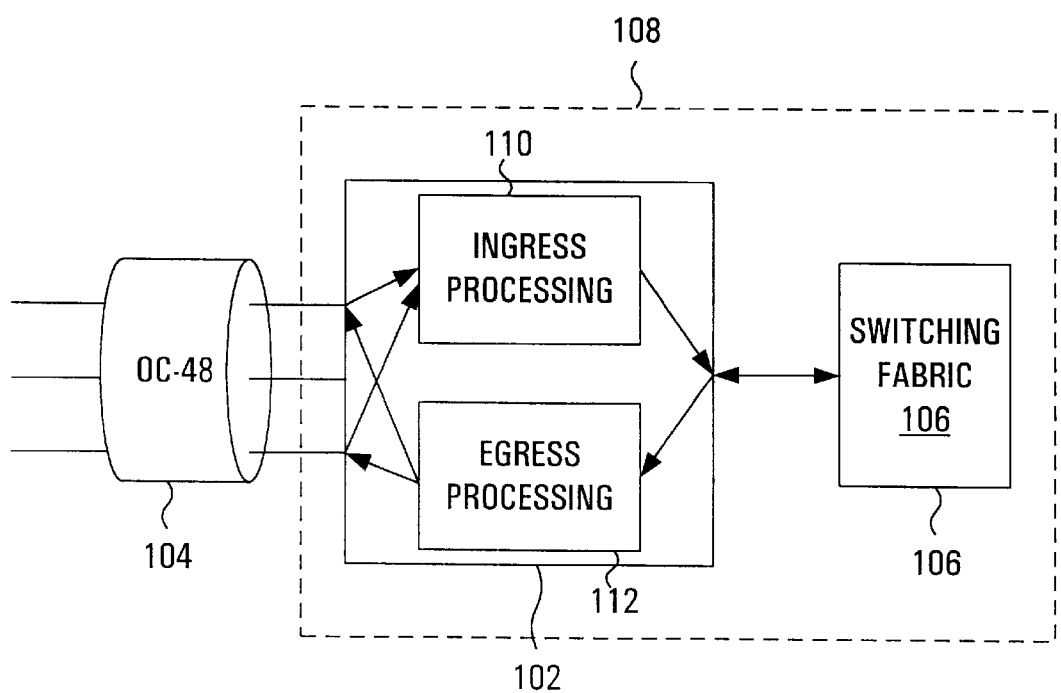
FIG. 1 is a simplified block diagram illustrating a standard switch interface.

FIG. 1 illustrates a standard implementation of a switch interface 102 that is coupled between a fibre optic cable 104 and a switching fabric 106. The switch interface 102 and the switching fabric 106 are comprised within a single router 108 that is coupled to a plurality of other routers via the fibre optic cable 104 along with a plurality of other fibre optic cables not shown. The switch interface 102 comprises an ingress processing block 110 and an egress processing block 112. The ingress processing block 110 inputs data streams from the fibre optic cable 104, processes the data streams as necessary, and outputs the processed data streams to the switching fabric 106 for further routing. The egress processing block 112, on the other hand, inputs data streams from the switching fabric 106, processes the data streams as necessary, and outputs the processed data streams to the fibre optic cable 104 for transmission to another router. In the preferred embodiment of the present invention, the fibre optic cable 104 is an OC-48 fibre optic cable and the switching fabric 106 is a rotator fabric as disclosed within U.S. Pat. No. 5,745,486 entitled "High Capacity ATM Switch" by Beshai et al, assigned to the assignee of the present invention, and incorporated by reference herein. It is noted that the present invention is not limited to this specific fibre optic cable or switching fabric and, in fact, is not limited to an implementation between a fibre optic cable and a switching fabric.

Although the preferred embodiment of the present invention is implemented within a switch interface 102 coupled between a fibre optic cable 104 and a switching fabric 106, it should be understood that the present invention is not to be limited to such an implementation. In fact, the present invention may be implemented as a data interface between any two devices that require data streams to be processed while being transferred between devices.

Figure 2:
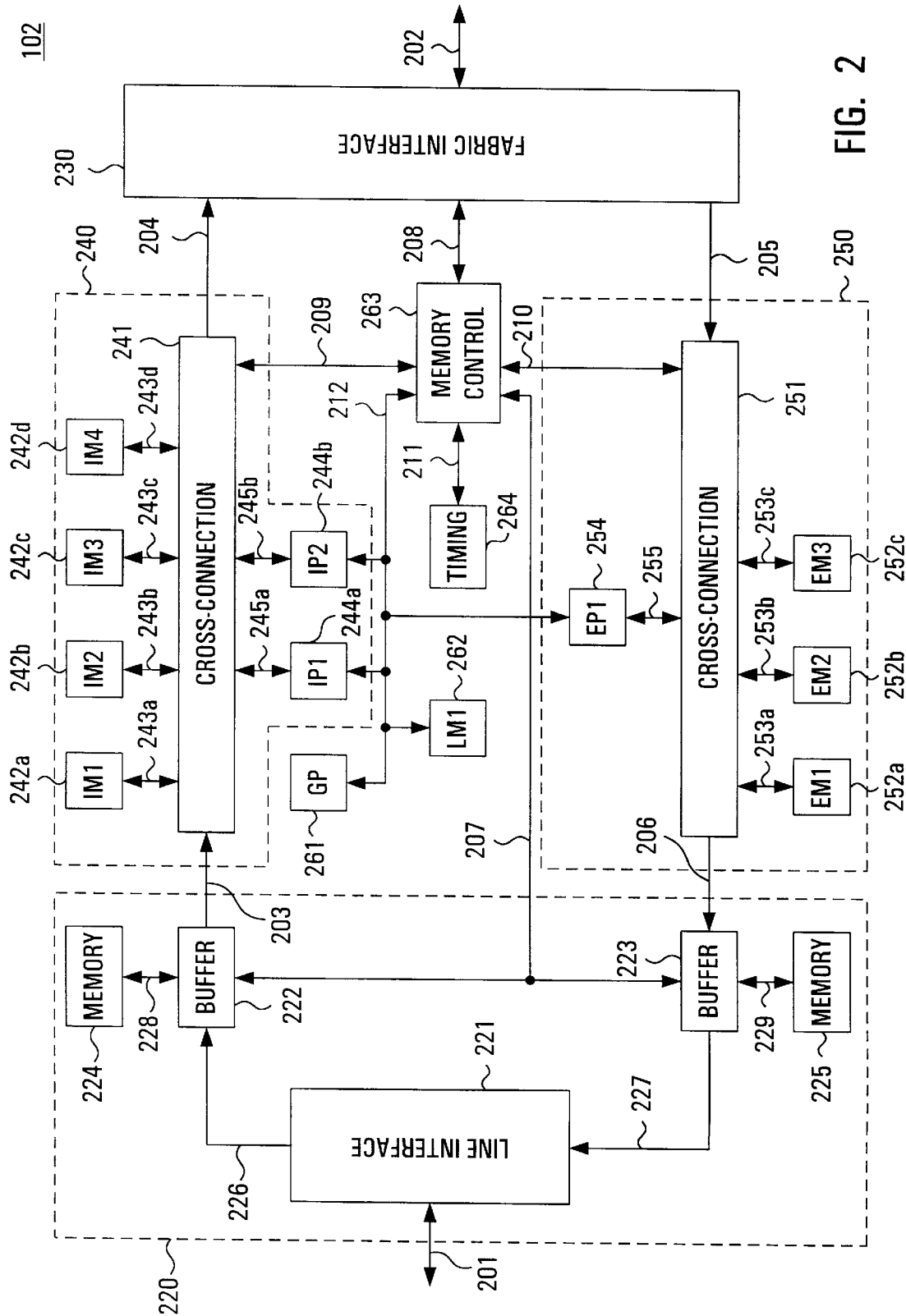
FIG. 2 is a block diagram illustrating the switch interface according to the preferred embodiment of the present invention.

A switch interface 102, according to the preferred embodiment of the present invention, is now described with reference to FIG. 2. The switch interface 102 comprises a line interface apparatus 220 coupled to the fibre optic cable 104 via bus 201, a fabric interface block 230 coupled to the switching fabric 106 via bus 202, an ingress block 240 coupled between the line interface apparatus 220 and the fabric interface block 230 via lines 203 and 204 respectively, and an egress block 250 coupled between the fabric interface block 230 and the line interface apparatus 220 via lines 205 and 206 respectively. The switch interface 102 further comprises a general processor (GP) 261, a local memory (LM1) 262, a memory control 263, and a timing block 264, each component of which will be described in detail herein below. The memory control 263 is coupled to the line interface apparatus 220 via bus 207, the fabric interface block 230 via bus 208, the ingress block 240 via bus 209, the egress block 250 via bus 210, and the timing block 264 via bus 211. Further, there is a general bus 212 that couples the ingress block 240, the egress block 250, the GP 261, the LM1 262, and the memory control 263 together, allowing for the transfer of data and control signals between these blocks.

The line interface apparatus 220 comprises a line interface block 221, first and second buffers 222,223, and first and second memory devices 224,225. The line interface block 221 is coupled to the first and second buffers 222,223 via lines 226,227 respectively. The first buffer 222 is further coupled to the first memory device 224 via bus 228, the ingress block 240 via the line 203, and the memory control 263 via the bus 207. The second buffer 223 is further coupled to the second memory device 225 via bus 229, the egress block 250 via the line 206, and the memory control 263 via bus 207.

The ingress block 240 comprises an ingress cross-connection block 241, that is a bus-switching device, coupled to first, second, third, and fourth ingress memory devices (IM1,IM2,IM3,IM4, in general IMn) 242a,242b, 242c,242d via buses 243a,243b,243c,243d and first and second ingress processors (IP1,IP2) 244a,244b via buses 245a,245b. The ingress cross-connection block 241 is further coupled to the first buffer 222 via line 203, the fabric interface block 230 via line 204, and the memory control 263 via bus 209. Each of the ingress processors 244a,244b are further coupled, via the general bus 212, to the GP 261, the LM1 262, and the memory control 263.

The egress block 250 comprises an egress cross-connection block 251, that is a bus-switching device, coupled to first, second, and third egress memory devices (EM1,EM2,EM3, in general EMn) 252a,252b,252c via buses 253a,253b,253c and an egress processor (EP1) 254 via bus 255. The egress cross-connection block 251 is further coupled to the fabric interface block 230 via line 205, the second buffer 223 via line 206, and the memory control 263 via bus 210. The EP1 254 is further coupled, via the general bus 212, to the GP 261, the LM1 262, and the memory control 263.

The preferred embodiment of the present invention addresses a problem within standard switch interfaces relating to the significant bandwidth required to move data streams, hereinafter referred to as Information Units (IUs), in and out of memories during the transferring and processing stages. The preferred embodiment utilizes standard memory devices and processors to allow an efficient transfer of IUs by limiting the number of times the IUs are moved within the switch interface.

The overall approach of the preferred embodiment of the present invention is to not require IUs input to one memory device to be shifted to other memory devices for processing and outputting. At a particular moment within the ingress operation according to the preferred embodiment, one IMn is coupled to the line interface apparatus 220 while IUs are input and stored, another IMn is coupled to the IP1 244a while approximately half of the IUs stored within the particular memory are processed, yet another IMn is coupled to the IP2 244b while the remaining unprocessed IUs stored within the particular memory are processed, and still another IMn is coupled to the fabric interface 230 while the processed IUs are output to the fabric interface 230. The stored IUs within each memory may proceed between these four stages, those being the inputting, first processing, second processing, and outputting stages, without being shifted between the IMns 242a,242b,242c,242d since the coupling of the IMns rotates, with use of the ingress cross-connection block 241, between the line interface apparatus 220, the IP1 244a, the IP2 244b, and the fabric interface block 230. A similar technique is utilized within the preferred embodiment for the egress operation of the switch interface 102 as will be described herein below.

A detailed description of the ingress process, within the switch interface 102 of the preferred embodiment, of transferring IUs from the fibre optic cable 104 to the switching fabric 106 is now described. This process contains steps that are performed by many different components and is meant to indicate an overall flow of events for a plurality of IUs while traversing the switch interface 102 and not a particular software algorithm that is performed.

Application-IUs (A-IUs) are input to the line interface block 221 by the fibre optic cable 104. A-IUs are IUs with meaning for the application using the switch interface, possibly being Asynchronous Transfer Mode (ATM) cells, frame relay frames, Internet Protocol (IP) packets, or circuit switching blocks from a SONET tributary such as STS-3. In the preferred embodiment, they are independent of the switching fabric 106 utilized.

The line interface block 221 processes the A-IUs by providing Synchronous Digital Hierarchy (SDH)/SONET termination and packet/cell/frame/circuit switching block delineation. After processing, each A-IU is forwarded to the first buffer 222 via line 226 while an input to memory flag is continuously being monitored for. The input to memory flag is triggered if the memory control 263 has indicated that an IMn is ready to receive A-IUs through the use of a start ingress session signal, described in detail herein below, sent via bus 207. If the input to memory flag is not triggered, the A-IUs input to the first buffer 222 are forwarded, via bus 228, to the first memory device 224 for temporary storage, further A-IUs are input to the first buffer 222, and the input to memory flag continues to be monitored for.

If the input to memory flag is triggered, A-IUs are transferred, starting with the A-IUs in the first memory device 224 and then proceeding with new inputted A-IUs from the line interface block 221, to the currently coupled IMn; in one example IM1 242a. As described herein above, only one of the IMns 242a,242b,242c,242d are coupled, via the ingress cross connection block 241, to the first buffer 222 at a time with the remaining IMns being coupled to other components.

Logically, within the preferred embodiment, the IMns are divided into fixed-sized blocks capable of holding the largest A-IU which may be received. Each individual block within an IMn is at any time listed within one of a number of chains. These chains include a free chain that indicates the blocks that are ready to be written to, a deferred chain that indicates the blocks that are ready to be processed, but are not currently being processed, a processor chain that indicates the one block, if any, within the IMn that is currently being processed, and fabric chains, one per destination, that indicate the blocks that are ready to output their A-IUs to a particular destination. Each chain listing is saved within the corresponding memory device with an associated chain pointer that indicates the next A-IU to be serviced.

The A-IUs are input into the memory blocks listed within the free chain for the particular coupled IMn, the free chain pointer indicating which of the blocks to input to. The incoming information is placed into consecutive memory locations within each memory block but with a leading offset to allow for the addition of packet forwarding headers. When the memory block being input to is switched, the free chain pointer increments and the next IMn listed in the free chain begins to receive the A-IUs. At the same time, the previous memory block is removed from the free chain and is added to the end of the deferred chain within the particular IMn.

In an alternative embodiment, the blocks are smaller than the largest A-IU with the memory block allocated for a particular A-IU changing during its inputting to the particular IMn. This increases the complexity within the memory control 263 while also increasing the flexibility of the memory allocation.

During the inputting of the A-IUs, a stop ingress session signal is monitored for by the first buffer 222 and the particular IMn coupled to the first buffer 222. The stop ingress session signal, as will be described herein below, is sent from the memory control 263 to the first buffer 222 via the bus 207; the IMns 242a,242b,242c,242d via the bus 209, the ingress cross-connection block 241, and buses 243a, 243b,243c,243d respectively; the IP1 and IP2 via the general bus 212; and the fabric interface block 230 via bus 208. The stop ingress session signal is sent to trigger the ingress components to stop the present operation as quickly as possible.

Subsequent to receiving the stop ingress session signal, the IMn coupled to the first buffer 222 finishes the inputting of the A-IU currently being input and then sends a ready to switch signal to the memory control 263. As each ingress component completes its current task, it sends a ready to switch signal to the memory control 263 via similar buses as used by the memory control 263 for the sending of the stop ingress session signal.

All of the ingress components then monitor for a start ingress session signal to be sent from the memory control 263. The start ingress session signal is sent after the memory control 263 receives ready to switch signals from all of the ingress components, as is further described herein below in a detailed description of the memory control 263. When the ingress cross-connection block 241 receives the start ingress session signal, it re-configures the couplings between the ingress components. The IMn coupled to the first buffer 222 is switched to the IP1 244a, the IMn coupled to the IP1 244a is switched to the IP2 244b, the IMn coupled to the IP2 244b is switched to the fabric interface block 230, and the IMn coupled to the fabric interface block 230 is switched to the first buffer 222.

Therefore, the previously discussed IMn coupled to the first buffer 222 is now coupled to the IP1 244a. In the preferred embodiment, approximately half of the memory blocks in the deferred chain of the discussed IMn are then sequentially moved to the processor chain, processed by the IP1 244a, removed from the processor chain, and added to a fabric chain corresponding to the destination of the particular A-IU. These processed IUs are hereinafter referred to as Rotator-IUs (R-IUs) since they are ready to be input to the fabric interface 230 and further into the switching fabric 106, a rotator fabric in the preferred embodiment as previously described. It is noted that the R-IUs format is specific to the switching fabric 106 utilized and would likely be different for other switching fabrics. In the preferred embodiment, the processing of approximately half the non-exception A-IUs is done with use of the IP1 244a and the processing of the other half is done with use of the IP2 244b. The non-exception processing work comprises input layer 2 and layer 3 look-up functions that would have different requirements for each type of A-IU and service, and Quality of Service (QoS) queueing for the fabric interface block 230. The processing of exception packets are described herein below.

QoS queueing includes decisions related to discarding IUs when too much traffic is directed to a single egress fabric port, hence causing an overload, hereinafter referred to as a fabric overload, within at least one First-In First-Out (FIFO) memory located in the fabric interface 230 of the particular port, the FIFO memory being described herein below. The ability of the switching fabric 106 to handle a fabric overload depends on the switching fabric 106 utilized since the fabric in some embodiments have buffers and/or can differentiate between priorities of IUs. In the preferred embodiment, the IP1 and IP2 244a,244b are notified of fabric overload problems through control signals sent from the fabric interface block 230 via the bus 208, the memory control 263, and the general bus 212, so that it can discard newly arriving lower priority IUs. In an alternative embodiment, the IP1 and IP2 244a,244b perform complex discard algorithms such as Random Early Discard (RED) in the event of a fabric overload. It is noted that in an ideal alternative embodiment, the switching fabric is completely non-blocking and so there is no requirement for the IP1 and IP2 244a,244b to discard any IUs in the ingress block 240.

The processing work to be completed by the IP1 244a and IP2 244b is divided, in the preferred embodiment, into four different categories, categories A through D. Category A work is work that must be completed before the IMns may be moved to the fabric interface block 230 if the proper A-IU ordering is to be preserved. For example, the forwarding of non-exception packets would be considered category A work. Category B work is data related work which requires the use of the IMn, but does not require it to be completed while the IMn is attached to the ingress processors. Creating and returning ICMP messages after receiving an exception packet, the processing of which is described herein below, would fall into this category. Category C work is non-data related housekeeping work which requires the use of the IMn and category D work is housekeeping work which does not require the use of the particular IMn. It is noted that one skilled in the art would understand alternative divisions for the processing work.

In the preferred embodiment, the IP1 244a and the IP2 244b prioritize processing work in the order of category A through to category D with category A being the highest priority. This is done to ensure that the non-exception A-IUs are processed in sequence. Exception A-IUs, on the other hand, are not required, within the preferred embodiment, to be maintained in order. Exception A-IUs are A-IUs that require exception processing for any one of a number of reasons, such as being too long for a particular protocol format. These A-IUs, in the preferred embodiment, are routed by the IP1 244a or the IP2 244b, via the general bus 212, to the GP 261 for processing.

The IP1 244a when coupled to an IMn performs, according to the preferred embodiment, approximately half the required category A work and then proceeds to do category B through D work. This continues until the IP1 244a receives a stop ingress session signal from the memory control 263 by similar means as previously described for the first buffer 222. At this point, the IP1 244a completes the processing of the current A-IU if still performing the category A work or interrupts any category B through D work being performed and subsequently sends a ready to switch signal to the memory control 263. In the preferred embodiment, the IP1 244a sends the ready to switch signal even before the reception of the stop ingress session signal if it starts to perform category D work.

Once the memory control 263 receives the ready to switch signal from all ingress components, it once again sends the start ingress session signal to the ingress components. When the ingress cross-connection block 241 receives the start ingress session signal, it rotates the coupling of the ingress components as described herein above. Therefore, the previously discussed IMn coupled to the IP1 244a is re-configured by the ingress cross-connection block 241 so as to be coupled to the IP2 244b. The IP2 244b then completes the processing of the category A work and proceeds to do category B, C, and D processing work. The IP2 244b detects which A-IU to process next through use of the deferred pointer which is maintained within the particular IMn that it is coupled.

The processing work being performed by the IP2 244b within the IM1 242a continues until a stop session signal sent from the memory control 263 is detected by the IP2 244b. If at this time, the IP2 244b is performing category A work, the processing continues until such work is completed. If the IP2 244b is performing category B, C, or D work when the stop ingress session signal arrives, the processing work is interrupted. In either case, once the processing work is complete, the IP2 244b sends a ready to switch signal to the memory control 263. Once again, in the preferred embodiment, the IP2 244b sends the ready to switch signal if it begins to perform category D work without regard to the stop ingress session signal.

Next, the ingress components again monitor for a start ingress session signal to be sent from the memory control 263. As previously described, this signal is sent once the memory control 263 has received ready to switch signals from all the ingress components.

Once the start ingress session signal is received by the ingress components, the ingress cross-connection block 241 re-configures the couplings between the ingress components as described previously. The previously discussed IMn is uncoupled from the IP2 244b and coupled to the fabric interface 230. The R-IUs within the fabric chains of this IMn are then sequentially input to the fabric interface block 230 and removed from the particular fabric chain. The input R-IUs are further processed in the fabric interface block 230 and output to the switching fabric 106. The processing within the fabric interface block 230, in the preferred embodiment, prepares the R-IUs to be input to the particular switching fabric 106 being utilized. This procedure continues until there are no R-IUs to be transferred or until a stop ingress session signal is received at the fabric interface block 230 and the particular IMn.

If at this point, all the R-IUs have not been transferred to the fabric interface block 230, then the remainder are transferred prior to the fabric interface block sending a ready to switch signal to the memory control 263. In the preferred embodiment, the timing, as is described herein below, is configured such that all the R-IUs are input to the fabric interface block 230 prior to the stop ingress session signal being sent and the ready to switch signal is sent to the memory control 263 by the IM1 242a once all the R-IUs have been forwarded to the fabric interface block 230.

The process described herein above is for a single IMn. Concurrently with the above operation, the other three IMns, in the preferred embodiment, are operating in similar fashion, but within a different stage of the ingress operation.

One alternative embodiment to the present invention has the IP1 244a process as much category A work as possible and only process category B through D work if all category A work is complete. In this case, the IP2 244b would process the remainder of the category A work and then proceed with category B, C, and D work. Another alternative embodiment of the present invention has the IP1 244a process all the non-exception A-IUs while the IP2 244b performs any exception handling work required. In this embodiment, the IP1 244a would not send the ready to switch signal to the memory control 263 until all category A work was completed. Yet another alternative embodiment has the IP1 244a read the header information of the A-IUs and the IP2 244b do all path look-up functions, hence dividing the processing work for each A-IU.

The egress process, within the switch interface 102 of the preferred embodiment, of transferring IUs from the switching fabric 106 to the fibre optic cable 104 is done in similar fashion to the ingress process described herein above. One key difference between the implementations is that the egress process converts R-IUs input from the switching fabric 106 into A-IUs which can be transmitted to various logical ports through the fibre optic cable 104. A key difference in the EMns is that they do not have fabric chains, but do have transmission chains, one per logical port within the preferred embodiment, that indicate the blocks that are ready to output their A-IUs to a particular logical port. In an alternative embodiment, the EMns have a transmission chain for each class of service that indicates the blocks from a particular class of service that are ready to output their A-IUs.

Similar to the ingress process, the egress process is controlled by the memory control 263 which sends start and stop egress session signals to all egress components. These signals are sent, within the preferred embodiment, from the memory control 263 to the second buffer 223 via the bus 207; the EMns 252a,252b,252c via the bus 210, the egress cross-connection block 251, and buses 253a,253b,253c respectively; the EP1 via the general bus 212; and the fabric interface block 230 via bus 208. The egress components also send ready to switch signals in similar fashion to that described for the ingress components previously.

In the preferred embodiment, the egress block 250 has only a single egress processor EP1 254 and thus all processing must take place at the one processing stage, hence requiring all category A processing work to be completed before a ready to switch signal may be transmitted from the EP1 254. In the preferred embodiment, this processing in the EP1 254 comprises all necessary egress functions such as shaping of the A-IUs.

At any one moment, one EMn is coupled to the fabric interface block 230 while IUs are being input and stored, one EMn is coupled to the EP1 254 while the IUs stored within coupled EMn are processed, and one EMn is coupled to the second buffer 223 while the processed IUs, which are A-IUs, are being output to the second buffer 223. Similar to the ingress process, the IUs input to a EMn do not require transferring to other EMns during the later processing and outputting stages since the egress cross-connection block 251 couples the particular EMn to the EP1 254 and the second buffer 223 respectively during the appropriate stages.

One key consideration in the egress process is that, in the preferred embodiment, the fibre optic cable 104 transmits at a slower rate than the switching fabric 106. This means that the outputting of A-IUs from a particular EMn coupled to the second buffer 223 will be faster than the line interface block 221 can process and output. This problem is solved with use of the second buffer 223 in combination with the second memory 225, in which A-IUs are input to the second memory 225 and output to the line interface block 221 on a FIFO basis. During periods of low traffic, the second memory 225 is emptied which results in the traffic being output on the fibre optic cable 104 staying relatively steady.

In the preferred embodiment, the fabric interface block 230 comprises queueing FIFO memories, as mentioned previously, that are each used to queue and possibly discard IUs from different classes of data traffic being input to the fabric interface block 230 from the switching fabric 106. Similar to the ingress with regard to fabric overload situations, the EP1 254 is notified, according to the preferred embodiment, of possible occurrences in which the queueing FIFO memories within the fabric interface block 230 are full through control signals sent from the fabric interface block 230 via the bus 208, the memory control 263, and the general bus 212. After receiving such a notification, the EP1 254 discards, according to the preferred embodiment, IUs within the at least one of the FIFO memories. There are control signals traversing the general bus 212, the memory control 263, and the bus 208 between the EP1 254 and the fabric interface block 230 that notify the EP1 254 of arriving IUs and indicate to the fabric interface block 230 either to send the IU to the egress block 250 or to discard the particular IU. The decision of which IUs to discard is performed within the EP1 254, and in an exemplary embodiment are done with use of a weighted fair queueing method which ensures that different classes of service are given the correct proportion of the available bandwidth.

A critical component of the switch interface 102 of the preferred embodiment is the memory control 263 which triggers the transfer in stages between the ingress and egress memory devices. Overall, in the preferred embodiment, it is a simple algorithm that is implemented within a Field Programmable Gate Array (FPGA). In alternative embodiments the memory control 263 is implemented in other means such as discrete logic components.

Figure 3:
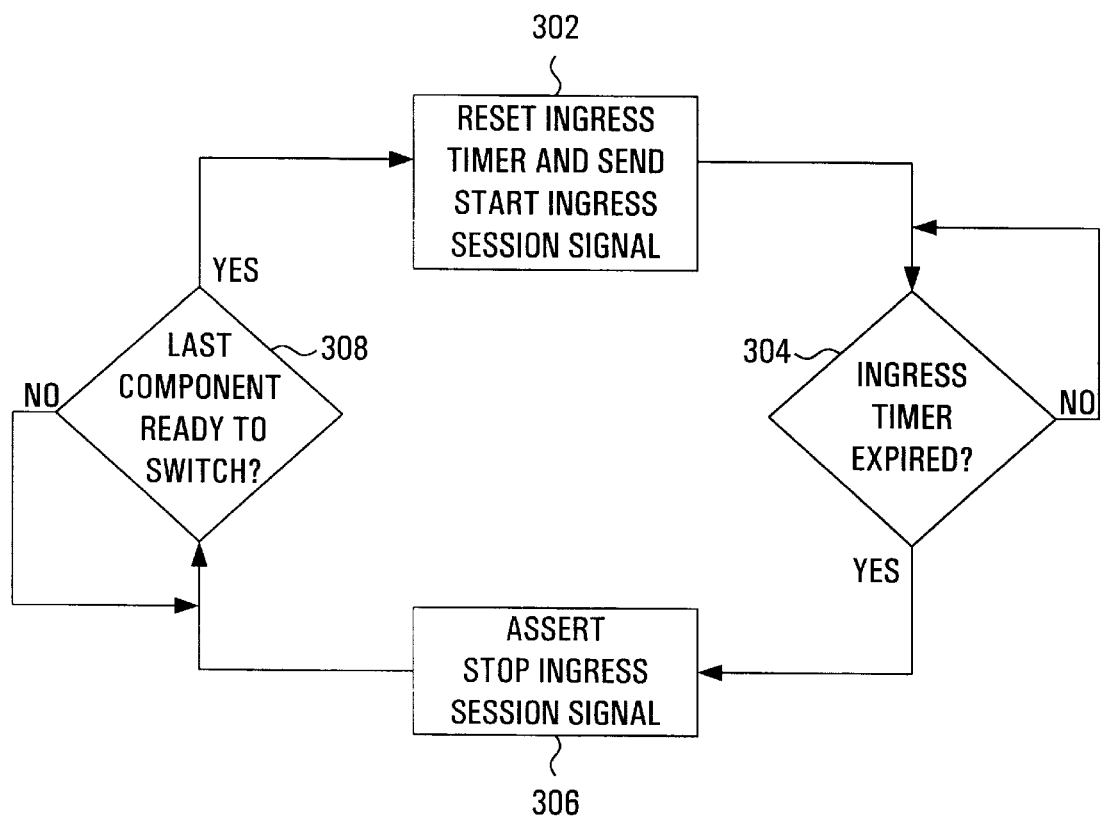
FIG. 3 is a flow chart illustrating the steps performed by the memory control used in the switch interface of FIG. 2.

The memory control 263, according to the preferred embodiment, operates independently for the ingress and egress processes. The ingress operation of the memory control 263 is now described with reference to FIG. 3. At the beginning of an ingress session cycle, depicted at step 302, the memory control 263 sets an ingress timer and sends a start ingress session signal to the ingress components at step 302. The ingress timer counts down from a predetermined time $T_i$ that is the ingress session time. There are many constraints required to be placed on the ingress session time $T_i$ in order for the operation of the switch interface 102, according to the preferred embodiment, to operate efficiently. These constraints are described in detail herein below.

Subsequently, the memory control 263 monitors for the ingress timer to expire at step 304. Once the ingress timer expires at step 304, the memory control 263 sends a stop ingress session signal to the ingress components at step 306 via buses as described previously. This stop ingress session signal stops any new A-IUs from being transferred from the first buffer 222 to the ingress block 240.

Next, the memory control 263 waits, as depicted at step 308, for each ingress component to send back a ready to switch signal. The first buffer 222 sends a ready to switch signal when the currently transferring A-IU has completely been sent. The IP1 and IP2 244a,244b send ready to switch signals when the required processing for the particular ingress processor is complete, as discussed previously. The fabric interface block 230 sends a ready to switch signal, in the preferred embodiment, when the last R-IU is output from the particular IMn. And, each IMn sends a ready to switch signal when the memory has completed its current operation.

As discussed previously for the preferred embodiment, the IP1 244a, the IP2 244b, and/or the fabric interface 230 may send a ready to switch signal to the memory control 263 prior to receiving the stop ingress session signal. In these cases, no stop ingress session signal is sent to the particular ingress component since the memory control 263 has already received the corresponding ready to switch signal.

Once the memory control 263 receives all the ready to switch signals from the ingress components at step 308, the cycle begins again at step 302 with the memory control 263 sending a start ingress session signal and resetting the ingress timer. The start ingress session signal, as described previously, triggers the ingress cross-connection block 241 to re-configure the ingress components for the next ingress cycle.

The memory control 263 controls the egress process in a very similar manner to that described above for the ingress process. Within the control algorithm for the egress process, the ingress timer is replaced by an egress timer which counts down from an egress cycle time $T_e$, the constraints of which are described herein below, and the start and stop ingress session signals are replaced with start and stop egress session signals sent from the memory control 263 to the egress components. The sending of the stop egress session signal stops any new R-IUs from being transferred to the egress block 250 from the fabric interface block 230. The start egress session signal is sent when the memory control 263 receives a ready to switch signal from all the egress components. The fabric interface 230 sends a ready to switch signal when the currently transferring R-IU is complete. The EP1 254 sends a ready to switch signal when the required processing of the R-IUs is complete. The second buffer 223 sends a ready to switch signal when the A-IUs are completely output from the particular EMn. And, each EMn sends a ready to switch signal when it has completed its current operation.

There are a number of constraints on the ingress and egress cycle times $T_i, T_e$ according to the preferred embodiment of the present invention. The cycle times should be as short as possible since the total ingress latency is $3T_i$ and the total egress latency is $2T_e$. On the other hand, the ingress and egress cycle times $T_i, T_e$ must be relatively long, in the preferred embodiment approximately 20 µs, to ensure that the fabric interface block 230 can input all in-sequence R-IUs from the particular coupled IMn within the ingress cycle time $T_i$ and the second buffer 223 can input all in-sequence A-IUs from the particular coupled EMn within the egress cycle time $T_e$. Another reason long cycle times $T_i, T_e$ are preferable is depicted within FIG. 4. Since the A-IU currently being input to an IMn when the ingress timer expires must be completely input, the IP1 and/or IP2 244a, 244b may be idle after completing their respective tasks and waiting for the start ingress session signal.

Figure 4:
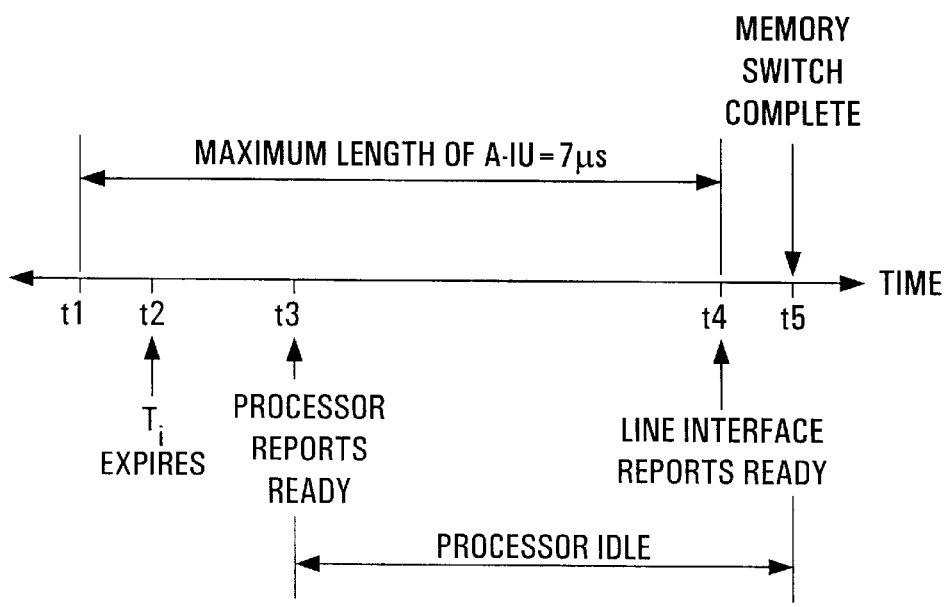
FIG. 4 is a plot illustrating timing considerations with respect to the switch interface of FIG. 2.

Within FIG. 4, an A-IU of maximum length is begun to be input from the first buffer 222 to an IMn at time t1. In this example, the maximum length A-IU, taken as 2048 octets with a data rate of 2.5 Gb/s, takes approximately 7 µs to input to the particular IMn. At time t2, shortly after time t1, the ingress timer expires and the stop ingress session signal is sent from the memory control 263. At a time t3, shortly after time t2, the IP1 244a completes processing of the A-IU currently being processed and sends a ready to switch signal to the memory control 263. Unfortunately, the maximum length A-IU is not fully input to the corresponding IMn until a time t4, 7 µs after time t1, and the IMns are not coupled to the new ingress component until a time t5, shortly after time t4. Therefore, as depicted in FIG. 4, the IP1 244a is idle from time t3 to time t5 when it can begin processing A-IUs stored within the newly coupled IMn. It is noted that the IP1 244a can be performing housekeeping activities using its local memory during this idle time, hence reducing the problem caused by the idle period.

An alternative embodiment of the present invention allows the IP1 and IP2 244a,244b to continue processing A-IUs until the A-IU currently being output by the first buffer 222 is fully input to the corresponding IMn.

Yet another factor, though currently deemed insignificant, is the amount of memory needed to receive the A-IUs during the time $T_i$ and the R-IUs during the time $T_e$. If ingress and egress memory devices of 1 Megabytes are utilized, 50% of which may be used for A-IU storage, this limits $T_i$ to a maximum of 1.6 ms at a data rate of 2.5 Gb/s. Since 1 Megabytes of memory is readily available and a maximum of 1.6 ms is not very limiting, the memory consideration is currently not critical.

Therefore, to determine the ingress and egress cycle times $T_i, T_e$, these considerations should be taken into account by the designer of the system understanding that these values will vary depending on the actual devices utilized and the data rate required. In the preferred embodiment of the present invention, the ingress and egress cycle times $T_i, T_e$ are chosen to be approximately 20 µs.

Details concerning the devices used within the preferred embodiment of the present invention are now described. It is noted that the line interface block 221 and the fabric interface block 230 are devices that have been adapted from well known switch interfaces in the preferred embodiment.

The ingress and egress cross-connection blocks 241,251, in the preferred embodiment, are non-blocking switch matrix parts that are well known within the industry. These devices can be configured to switch buses of width 4, 8, 16 or 32 bits. Typical times to switch the buses to a new configuration is 12.5 ns and the I/O delay is typically 7 ns. The number of these devices required to support the ingress functionality of the present invention depends on the designer's chosen memory speeds. In the preferred embodiment, four such devices are utilized with sufficient spare lines within the cross-connection block 241 so as to support parity error detection. The egress functionality can be supported by similar devices.

The IMns and EMns, in the preferred embodiment, need to be sufficiently large to contain the maximum number of A-IUs which may be received during the ingress and egress cycle times $T_i, T_e$ respectively, as well as to handle any deferred packets and chain pointers that are required. In the preferred embodiment, 1 MOctet is determined to be sufficiently large for these devices. The IMns and EMns, according to the present invention are Static Random Access Memories (SRAMs), but in alternative embodiments other memories such as Synchronous Dynamic Random Access Memories (SDRAMs) are utilized. The key advantage of using SRAMs compared to SDRAMs is the increased access rates with the disadvantage being the higher cost per part.

The ingress and egress processors must be capable of high-speed data handling. Within the preferred embodiment, the processors are programmed in C with particular reference to the assembler produced. The ingress and egress processors, according to the preferred embodiment, are general purpose processors, though alternative embodiments of the present invention utilize microprocessors specialized in processing data packets for switching such as Bay Networks' proprietary packet processing CPU. The preferred embodiment utilizes general purpose processors since the advantages of improvements due to a fast development curve are seen as greater than the advantages of the specialized processor.

The GP 261 and the LM1 262, within the preferred embodiment of the present invention, are standard devices which one skilled in the art would understand do not require significant redesign from similar parts implemented within previous switch interfaces. The GP 161 is utilized to perform housekeeping functions for the overall switch interface 102 including card diagnostics, interface startup, software downloads, and Operations, Administration, and Maintenance (OAM) interfaces, all of which one skilled in the art would understand. As well, in the preferred embodiment, some or all of the exception A-IUs are routed to the GP 261 for processing. The LM1 262, according to the preferred embodiment, comprises program information and master look-up tables for the switch interface 102. It is noted that copies of these look-up tables may, in the preferred embodiment, be kept at the individual memory devices in order to reduce the congestion on the general bus 212.

There are a number of key advantages of the preferred embodiment of the present invention compared to previous switch interfaces. For one, the processors utilized do not have to load the entire IUs over their memory busses in order to have full access to all portions of the an IU including the IU header or the whole IU if needed. In the present invention, the IUs are loaded into a memory device when the memory device is not coupled to a processor and the processor(s) subsequently have full access to the IUs when later coupled to the loaded memory devices. A second key advantage of the preferred embodiment of the present invention is the ability to use standard parts which reduces costs and significantly reduces the development time to create new versions of the switching interface 102 since the advancements in the switch interface 102 can follow the development curves of general purpose devices. A third key advantage of the preferred embodiment is that it provides, in general terms, a structure that can be easily adapted, through software rather than hardware, to specific requirements such as changes in standards or the introduction of new standards; hence, increasing the time before hardware is required to be replaced.

The preferred embodiment of the present invention uses a line interface block 221 that is capable of re-assembling packets and so such re-assembling is not required prior to the line interface block 221. In an alternative embodiment, a simpler line interface block 221 is used and so a small amount of additional memory is added as a re-assembly area prior to the line interface block 221. One such alternative embodiment uses the previously discussed queueing FIFO memories within the fabric interface block 230 for the re-assembly.

Another alternative embodiment of the present invention has two switch interfaces according to the preferred embodiment of the present invention back to back with the switching fabric 106 removed. In this setup, data input to the switch interface from a first fibre optic cable can be output to another fibre optic cable after being processed. Similarly, another embodiment utilizes two switch interfaces according to the preferred embodiment back to back coupled to a switching fabric on either side.

Yet another alternative embodiment utilizes the seven ingress and egress memories of the preferred embodiment in a single circle, having each of the seven memories proceed through a cyclical process. This cyclical process, according to this alternative embodiment, comprises the steps of being coupled to the first buffer 222 while IUs are input and stored; being coupled to the IP1 244a while approximately half of the IUs stored within the particular memory are processed from A-IUs to R-IUs; being coupled to the IP2 244b while the remaining unprocessed IUs stored within the particular memory are processed from A-IUs to R-IUs; being coupled to the ingress portion of the fabric interface block 230 while the processed IUs, which are R-IUs, are output to the fabric interface block 230; being coupled to the egress portion of the fabric interface block 230 while IUs are being input and stored; being coupled to the EP1 254 while the IUs stored within coupled memory are processed from R-IUs to A-IUs; and being coupled to the second buffer 223 while the processed IUs, which are A-IUs, are being output to the second buffer 223.

The functionality of this alternative embodiment is similar to that described above for the preferred embodiment, but with some modifications. For example, in this embodiment the timing of the ingress and egress operations must be tied together, the cross-connection blocks must be combined into a single block with a large number of ports, and a safety measure should be implemented to ensure that IUs are not inadvertently sent through the switch interface 102 the wrong direction. On the other hand, there are a number of advantages of this arrangement such as allowing ingress A-IUs, such as ping packets, to be modified and directly sent back out on the fibre optic cable 104. As well, this embodiment might allow for easier testing by providing return loops for R-IUs on the switching fabric 106.

Although the embodiments of the present invention described herein above have four IMns, two ingress processors, three EMns, and a single egress processor, it should be understood that these numbers can be changed in alternative embodiments. Additional processors and memories may be added so that additional processing stages are performed within the ingress and/or egress operations. As well, within the ingress block, the ingress process can be simplified by utilizing only a single processor and therefore only having a single processing stage.

Despite describing the preferred embodiment of the present invention as a combination of standard devices, it would be understood by one skilled in the art that the present invention could also be implemented within one or more ASICs. This would likely increase the time it took for modifications to the design to be implemented, but could allow for more specialized designs.

Persons skilled in the art will appreciate that there are alternative implementations and modifications possible to use an apparatus similar to that described above to route and process data between two interfacing devices, and that the above implementation is only an illustration of this embodiment of the invention. The scope of the invention, therefore, is only to be limited by the claims appended hereto.

We claim:

1. An interface apparatus capable of being coupled between first and second data apparatuses, the interface apparatus comprising at least one processor and at least three memory devices; and wherein each of the memory devices is arranged to be coupled to the first data apparatus during different respective time periods to input and store data information units from the first data apparatus; each of the memory devices is arranged to be coupled to the processor during different respective time periods to process the stored data information units with use of the processor; and each of the memory devices is arranged to be coupled to the second data apparatus during different respective time periods to output the processed data information units to the second data apparatus.

2. An interface apparatus according to claim 1, wherein at least one of the first and second data apparatuses is a fibre optic cable; and wherein the interface apparatus further comprises a line interface block arranged to be coupled between the fibre optic cable and the memory devices.

3. An interface apparatus according to claim 1, wherein at least one of the first and second data apparatuses is a switching fabric; and wherein the interface apparatus further comprises a fabric interface block arranged to be coupled between the switching fabric and the memory devices.

4. An interface apparatus according to claim 1, wherein the first data apparatus is a fibre optic cable and the second data apparatus is a switching fabric;

wherein the interface apparatus further comprises a line interface block arranged to be coupled between the fibre optic cable and the memory devices, and a fabric interface block arranged to be coupled between the switching fabric and the memory devices; and wherein the data information units are transferred, during processing, from a first format useable within the fibre optic cable to a second format useable within the switching fabric.

5. An interface apparatus according to claim 4, wherein the data information units, when in the first format, are at least one of Asynchronous Transfer Mode (ATM) cells, frame relay frames, Internet Protocol (IP) packets, and circuit switching blocks.

6. An interface apparatus according to claim 1, wherein the first data apparatus is a switching fabric and the second data apparatus is a fibre optic cable;

wherein the interface apparatus further comprises a fabric interface block arranged to be coupled between the switching fabric and the memory devices, and a line interface block arranged to be coupled between the fibre optic cable and the memory devices; and wherein the data information units are transferred, during processing, from a first format useable within the switching fabric to a second format useable within the fibre optic cable.

7. An interface apparatus according to claim 6, wherein the data information units, when in the second format, are at least one of Asynchronous Transfer Mode (ATM) cells, frame relay frames, Internet Protocol (IP) packets, and circuit switching blocks.

8. An interface apparatus according to claim 1 further comprising a cross-connection apparatus coupled to each of the memory devices and the processor, and arranged to be coupled to the first and second data apparatuses; and wherein the coupling of the memory devices to the processor and the first and second data apparatuses is via the cross-connection apparatus.

9. An interface apparatus according to claim 1 further comprising an inputting block arranged to be coupled to the first data apparatus, an outputting block arranged to be coupled to the second data apparatus, and a cross-connection apparatus coupled to each of the memory devices, the processor, and the inputting and outputting blocks; and wherein the coupling of the memory devices to the processor, the first data apparatus, and the second data apparatus is via the cross-connection apparatus, the cross-connection apparatus and the inputting block, and the cross-connection apparatus and the outputting block respectively.

10. An interface apparatus according to claim 1 further comprising a memory device controller that controls, with use of control logic, the coupling of the memory devices to the first and second data apparatuses and the processor.

11. An interface apparatus according to claim 10 further comprising an inputting block arranged to be coupled to the first data apparatus, an outputting block arranged to be coupled to the second data apparatus, and a cross-connection apparatus coupled to each of the memory devices, the processor, and the inputting and outputting blocks;

wherein the coupling of the memory devices to the processor, the first data apparatus, and the second data apparatus is via the cross-connection apparatus, the cross-connection apparatus and the inputting block, and the cross-connection apparatus and the outputting block respectively; and wherein the control logic, during each cycle, comprises the steps of: setting a timer for a predetermined cycle time; when the timer expires, sending a stop session signal to the cross-connection apparatus, the inputting block, the processor, and the outputting block; monitoring for a received ready to switch signal from each of the cross-connection apparatus, the inputting block, the processor, and the outputting block; and when all of the ready to switch signals are received, sending a start session signal to the cross-connection apparatus, the inputting block, the processor, and the outputting block.

12. An interface apparatus according to claim 1 further comprising a general processor coupled to the processor; and wherein the processor routes data information units requiring exception processing to the general processor, the general processor processes the exception data information units, and the general processor outputs the processed exception data information units to the second data apparatus.

13. An interface apparatus according to claim 1, wherein the processor is a general purpose processor.

14. An interface apparatus according to claim 1, wherein at least one of the memory devices and processor is implemented on an Application Specific Integrated Circuit (ASIC).

15. An interface apparatus according to claim 1, wherein the at least three memory devices comprise first, second; and third memory devices;

wherein, after a first switching parameter is met, the first, second, and third memory devices are arranged to be coupled to the first data apparatus, the processor, and the second data apparatus respectively until a second switching parameter is met;

wherein, after the second switching parameter is met, the first, second, and third memory devices are arranged to be coupled to the processor, the second data apparatus, and the first data apparatus respectively until a third switching parameter is met; and wherein, after the third switching parameter is met, the first, second, and third memory devices are arranged to be coupled to the second data apparatus, the first data apparatus, and the processor respectively until the first switching parameter is met.

16. An interface apparatus according to claim 15, wherein at least one of the first, second, and third switching parameters is met if a predetermined time expires since the last switching parameter being met and subsequently the inputting of the data information unit currently being input from the first data apparatus is complete, the necessary processing of the data information units is complete, and the outputting of the data information units to the second data apparatus is complete.

17. An interface apparatus according to claim 1, wherein the at least one processor comprises a plurality of processors and the at least three memory devices comprises at least four memory devices; and wherein each of the memory devices is arranged to be coupled to the first data apparatus during different respective time periods to input and store data information units from the first data apparatus; each of the memory devices is arranged to be coupled to each of the processors during different respective time periods to process the stored data information units with use of the processors; and each of the memory devices is arranged to be coupled to the second data apparatus during different respective time periods to output the processed data information units to the second data apparatus.

18. An interface apparatus according to claim 17, wherein the plurality of processors comprises first and second processors and the at least four memory devices comprises first, second, third, and fourth memory devices; and wherein, after a first switching parameter is met, the first, second, third, and fourth memory devices are arranged to be coupled to the first data apparatus, the first processor, the second processor, and the second data apparatus respectively until a second switching parameter is met;

wherein, after the second switching parameter is met, the first, second, third, and fourth memory devices are arranged to be coupled to the first processor, the second processor, the second data apparatus, and the first data apparatus respectively until a third switching parameter is met;

wherein, after the third switching parameter is met, the first, second, third, and fourth memory devices are arranged to be coupled to the second processor, the second data apparatus, the first data apparatus, and the first processor respectively until a fourth switching parameter is met; and wherein, after the fourth switching parameter is met, the first, second, third, and fourth memory devices are arranged to be coupled to the second data apparatus, the first data apparatus, the first processor, and the second processor respectively until the first switching parameter is met.

19. An interface apparatus according to claim 18, wherein at least one of the first, second, third, and fourth switching parameters is met if a predetermined time expires since the last switching parameter being met and subsequently the inputting of the data information unit currently being input from the first data apparatus is complete, the processing of the data information unit currently being processed by the first processor is complete, the necessary processing of the data information units with the second processor is complete, and the outputting of the data information units to the second data apparatus is complete.

20. An interface apparatus according to claim 18, wherein at least one of the first, second, third, and fourth switching parameters is met if a predetermined time expires since the last switching parameter being met and subsequently the inputting of the data information unit currently being input from the first data apparatus is complete, the necessary processing of the data information units with the first processor is complete, the processing of the data information unit currently being processed by the second processor is complete, and the outputting of the data information units to the second data apparatus is complete.

21. An interface apparatus according to claim 1, wherein the at least three memories are at least six memories and the at least one processor is at least one first processor and at least one second processor;

wherein each of the memory devices is arranged to be coupled to the first data apparatus during different respective time periods to input and store data information units from the first data apparatus; each of the memory devices is arranged to be coupled to the first processor during different respective time periods to process the stored data information units from the first data apparatus with use of the first processor; each of the memory devices is arranged to be coupled to the second data apparatus during different respective time periods to output the processed data information units to the second data apparatus; each of the memory devices is arranged to be coupled to the second data apparatus during different respective time periods to input and store data information units from the second data apparatus; each of the memory devices is arranged to be coupled to the second processor during different respective time periods to process the stored data information units from the second data apparatus with use of the second processor; and each of the memory devices is arranged to be coupled to the-first data apparatus during different respective time periods to output the processed data information units to the first data apparatus.

22. An interface apparatus according to claim 21, wherein the first data apparatus is a fibre optic cable and the second data apparatus is a switching fabric;

wherein the interface apparatus further comprises a line interface block arranged to be coupled between the fibre optic cable and the memory devices, and a fabric interface block arranged to be coupled between the switching fabric and the memory devices; and wherein the data information units are transferred, during processing with the first processor, from a first format useable within the fibre optic cable to a second format useable within the switching fabric and are transferred, during processing with the second processor, from the second format to the first format.

23. An interface apparatus arranged to be coupled between first and second data apparatuses, the interface apparatus comprising at least one ingress processor, at least three ingress memory devices, at least one egress processor, and at least three egress memory devices;

wherein each of the ingress memory devices is arranged to be coupled to the first data apparatus during different respective time periods to input and store first data information units from the first data apparatus; each of the ingress memory devices is arranged to be coupled to the ingress processor during different respective time periods to process the stored first data information units with use of the ingress processor; and each of the ingress memory devices is arranged to be coupled to the second data apparatus during different respective time periods to output the processed first data information units to the second data apparatus; and wherein each of the egress memory devices is arranged to be coupled to the second data apparatus during different respective time periods to input and store second data information units from the second data apparatus; each of the egress memory devices is arranged to be coupled to the egress processor during different respective time periods to process the stored second data information units with use of the egress processor; and each of the egress memory devices is arranged to be coupled to the first data apparatus during different respective time periods to output the processed second data information units to the first data apparatus.

24. An interface apparatus according to claim 23, wherein the first data apparatus is a fibre optic cable and the second data apparatus is a switching fabric;

wherein the interface apparatus further comprises a line interface block arranged to be coupled between the fibre optic cable and the ingress and egress memory devices, and a fabric interface block arranged to be coupled between the switching fabric and the ingress and egress memory devices; and wherein the first data information units are transferred, during ingress processing, from a first format useable within the fibre optic cable to a second format useable within the switching fabric, and the second data information units are transferred, during egress processing, from the second format to the first format.

25. An interface apparatus according to claim 23 further comprising an ingress cross-connection apparatus coupled to each of the ingress memory devices and the ingress processor, and arranged to be coupled to the first and second data apparatuses;

wherein the coupling of the ingress memory devices to the ingress processor and the first and second data apparatuses is via the ingress cross-connection apparatus;

wherein the interface apparatus further comprises an egress cross-connection apparatus coupled to each of the egress memory devices and the egress processor, and arranged to be coupled to the first and second data apparatuses; and wherein the coupling of the egress memory devices to the egress processor and the first and second data apparatuses is via the egress cross-connection apparatus.

26. An interface apparatus according to claim 23 further comprising a first input/output (I/O) block arranged to be coupled to the first data apparatus; a second I/O block arranged to be coupled to the second data apparatus; an ingress cross-connection apparatus coupled to each of the ingress memory devices, the ingress processor, and the first and second I/O blocks; and an egress cross-connection apparatus coupled to each of the egress memory devices, the egress processor, and the first and second I/O blocks;

wherein the coupling of the ingress memory devices to the ingress processor, the first data apparatus, and the second data apparatus is via the ingress cross-connection apparatus, the ingress cross-connection apparatus and the first I/O block, and the ingress cross-connection apparatus and the second I/O block respectively; and wherein the coupling of the egress memory devices to the egress processor, the first data apparatus, and the second data apparatus is via the egress cross-connection apparatus, the egress cross-connection apparatus and the second I/O block, and the ingress cross-connection apparatus and the first I/O block respectively.

27. An interface apparatus according to claim 23 further comprising a memory device controller that controls, with use of ingress control logic, the coupling of the ingress memory devices to the first and second data apparatuses and the ingress processor and controls, with use of egress control logic, the coupling of the egress memory devices to the first and second data apparatuses and the egress processor.

28. An interface apparatus according to claim 23 further comprising a first input/output (I/O) block arranged to be coupled to the first data apparatus; a second I/O block arranged to be coupled to the second data apparatus; an ingress cross-connection apparatus coupled to each of the ingress memory devices, the ingress processor, and the first and second I/O blocks; and an egress cross-connection apparatus coupled to each of the egress memory devices, the egress processor, and the first and second I/O blocks;

wherein the coupling of the ingress memory devices to the ingress processor, the first data apparatus, and the second data apparatus is via the ingress cross-connection apparatus, the ingress cross-connection apparatus and the first I/O block, and the ingress cross-connection apparatus and the second I/O block respectively;

wherein the coupling of the egress memory devices to the egress processor, the first data apparatus, and the second data apparatus is via the egress cross-connection apparatus, the egress cross-connection apparatus and the second I/O block, and the ingress cross-connection apparatus and the first I/O block respectively;

wherein the ingress control logic, during each ingress cycle, comprises the steps of: setting an ingress timer for a predetermined ingress cycle time; when the ingress timer expires, sending a stop ingress session signal to the ingress cross-connection apparatus, the first and second I/O blocks, and the ingress processor; monitoring for a received ready to switch signal from each of the ingress cross-connection apparatus, the first and second I/O blocks, and the ingress processor; and when all of the ready to switch signals are received, sending a start ingress session signal to the ingress cross-connection apparatus, the first and second I/O blocks, and the ingress processor; and wherein the egress control logic, during each egress cycle, comprises the steps of: setting an egress timer for a predetermined egress cycle time; when the egress timer expires, sending a stop egress session signal to the egress cross-connection apparatus, the first and second I/O blocks, and the egress processor; monitoring for a received ready to switch signal from each of the egress cross-connection apparatus, the first and second I/O blocks, and the egress processor; and when all of the ready to switch signals are received, sending a start egress session signal to the egress cross-connection apparatus, the first and second I/O blocks, and the egress processor.

29. An interface apparatus according to claim 23 further comprising a general processor coupled to the ingress and egress processors;

wherein the ingress processor routes first data information units requiring exception processing to the general processor, the general processor processes the exception first data information units, and the general processor outputs the processed exception first data information units to the second data apparatus; and wherein the egress processor routes second data information units requiring exception processing to the general processor, the general processor processes the exception second data information units, and the general processor outputs the processed exception second data information units to the first data apparatus.

30. An interface apparatus according to claim 23, wherein the at least one ingress processor comprises a plurality of ingress processors, the at least three ingress memory devices comprises at least four ingress memory devices, the at least one egress processor comprises a plurality of egress processors, and the at least three egress memory devices comprises at least four egress memory devices;

wherein each of the ingress memory devices is arranged to be coupled to the first data apparatus during different respective time periods to input and store first data information units from the first data apparatus; each of the ingress memory devices is arranged to be coupled to each of the ingress processors during different respective time periods to process the stored first data information units with use of the ingress processors; and each of the ingress memory devices is arranged to be coupled to the second data apparatus during different respective time periods to output the processed first data information units to the second data apparatus; and wherein each of the egress memory devices is arranged to be coupled to the second data apparatus during different respective time periods to input and store second data information units from the second data apparatus; each of the egress memory devices is arranged to be coupled to each of the egress processors during different respective time periods to process the stored second data information units with use of the egress processors; and each of the egress memory devices is arranged to be coupled to the first data apparatus during different respective time periods to output the processed second data information units to the first data apparatus.

31. An interface apparatus according to claim 23, wherein the at least one ingress processors comprise first and second ingress processors, the at least three ingress memory devices comprise first, second, third, and fourth ingress memory devices, the at least one egress processor comprises a first egress processor, and the at least three egress processors comprise first, second, and third egress processors.

32. A combined interface apparatus comprising first and second interface apparatuses according to claim 23, wherein the first interface apparatus is coupled to the second interface apparatus in series.

33. In an interface apparatus arranged to be coupled between first and second data apparatuses, a method of transferring data information units between the first and second apparatuses comprising the steps of:

coupling each of at least three memory devices to the first data apparatus at different respective first times;

inputting data information units from the first data apparatus to each of the memory devices during different respective first time periods starting at the different respective first times;

uncoupling each of the memory devices from the first data apparatus and coupling each of the memory devices to a processor at different respective second times;

processing the stored data information units within each of the memory devices with use of the processor during different respective second time periods starting at the different respective second times;

uncoupling each of the memory devices from the processor and coupling each of the memory devices to the second data apparatus at different respective third times; and outputting the processed data information units within each of the memory devices to the second data apparatus during different respective third time periods starting at the different respective third times.

* * * * *